United States Patent
Raab et al.

(10) Patent No.: US 10,705,221 B2
(45) Date of Patent: Jul. 7, 2020

(54) ON-BOARD BACKUP AND ANTI-SPOOFING GPS SYSTEM

(71) Applicant: THE BOEING COMPANY, Chicago, IL (US)

(72) Inventors: Christopher W. Raab, Chicago, IL (US); John W. Glatfelter, Chicago, IL (US); Kelly C. Hill, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 502 days.

(21) Appl. No.: 15/177,134

(22) Filed: Jun. 8, 2016

(65) Prior Publication Data
US 2017/0357009 A1 Dec. 14, 2017

(51) Int. Cl.
| | |
|---|---|
| *G01S 19/21* | (2010.01) |
| *G01S 19/48* | (2010.01) |
| *H04L 9/32* | (2006.01) |
| *G01S 19/03* | (2010.01) |
| *G01S 19/35* | (2010.01) |

(52) U.S. Cl.
CPC ............ *G01S 19/215* (2013.01); *G01S 19/03* (2013.01); *G01S 19/35* (2013.01); *G01S 19/48* (2013.01); *H04L 9/3236* (2013.01); *H04L 2209/38* (2013.01)

(58) Field of Classification Search
CPC .......... G01S 19/03; G01S 19/35; G01S 19/48; G01S 19/20–215
See application file for complete search history.

(56) References Cited

U.S. PATENT DOCUMENTS

| | | | | |
|---|---|---|---|---|
| 6,469,660 | B1 * | 10/2002 | Horvath | G01S 7/06 |
| | | | | 342/179 |
| 6,779,752 | B1 * | 8/2004 | Ratkovic | F41G 7/346 |
| | | | | 244/3.1 |
| 8,560,218 | B1 * | 10/2013 | Kahn | G01S 19/215 |
| | | | | 701/469 |
| 9,432,967 | B2 * | 8/2016 | Jung | H04W 64/00 |
| 9,435,874 | B2 * | 9/2016 | Edge | G01S 5/0018 |
| 9,862,488 | B2 * | 1/2018 | Hunt | B64C 39/024 |
| 10,429,839 | B2 * | 10/2019 | Liu | B64C 39/024 |
| 2008/0235509 | A1 | 9/2008 | Laberteaux et al. | |
| 2011/0227787 | A1 | 9/2011 | Gum et al. | |
| 2014/0097984 | A1 | 4/2014 | Stevens | |
| 2015/0332593 | A1 | 11/2015 | Munns et al. | |

OTHER PUBLICATIONS

Nakamoto, Satoshi, "Bitcoin: A Peer-to-Peer Electronic Cash System", Oct. 2008 (Year: 2008).*

(Continued)

*Primary Examiner* — Cassi J Galt
(74) *Attorney, Agent, or Firm* — Moore Intellectual Property Law PLLC (57) ABSTRACT

Disclosed is an on-board backup and anti-spoofing GPS ("OBASG") system for navigating a vehicle through an environment with a GPS receiver. The GPS receiver is configured to receive GPS signals within the environment where the GPS signals may suffer a GPS outage or are unreliable within the environment. In general, the OBASG includes a GPS block-chain recorder, a block-chain storage module, an anti-spoofing module, and a backup navigation module.

20 Claims, 6 Drawing Sheets

(56) References Cited

OTHER PUBLICATIONS

European Patent Office Extended European Search Report, Application No. 17166653.0-1812 / 3133413, dated Nov. 2, 2017.
Anonymous, "Blockchain (database)—Wikipedia," retrieved from the Internet: URL:https://en.wikipedia.org/w/index.php?title=Blockchain_(database)&oldid=696261810, Dec. 21, 2015, retrieved Jan. 30, 2017.
Fernandez, Ignacio, et al., "A Navigation Message Authentication Proposal for the Galileo Open Service", Journal of the Institute of Navigation, Mar. 1, 2016, pp. 85-102, vol. 63, No. 1, Institute of Navigation, Fairfax, VA.

* cited by examiner

ON-BOARD BACKUP AND ANTI-SPOOFING GPS SYSTEM

BACKGROUND

1. Field

The present disclosure relates to Global Position System ("GPS") navigation, and more, particularly to navigation through unreliable GPS environments.

2. Related Art

At present, the United States ("U.S.") Government is moving forward initiatives that are creating an ever increasing dependency on the utilization of Global Position System ("GPS") for navigation in military operations, government intelligence gathering activities, commercial airspace management, railway collision avoidance, maritime operations, and consumer navigation.

Existing GPS navigation systems include NAVSTAR (an acronym derived from either "Navigation Signal Timing and Ranging" or "Navigation Satellite Timing and Ranging") developed and operated by the United States Air Force and the Global Navigation Satellite System ("GLONASS") developed by the Soviet Union and presently operated by the Russia Aerospace Defense Forces. Future GPS navigation systems will include global navigation satellite system ("GNSS") known as GALILEO that is be produced by the European Space Agency ("ESA") of the European Union ("EU"), the Indian Regional Navigation Satellite System ("IRNSS") that is being produced by the Indian Space Research Organization ("ISRO"), and Chinese BeiDou Navigation Satellite System being produced by China.

At present, for military navigation and mission planning, GPS is at the center of intelligence gathering processes, mission planning, and navigation of military airspace and ground vehicles. Additionally, for commercial aerospace applications, GPS position determination techniques are utilized for all phases of a flight from departure, in route, and arrival, to airport surface navigation. As an example, the U.S. Federal Aviation Administration ("FAA") is implementing a new national aviation system, known as Next Generation Air Transport System ("NextGen"), that is transforming the U.S. air traffic control system from a radar-based tracking system utilizing radio communications with a GPS-based tracking system. The reason for this is that a GPS-based tacking will allow more direct routing that will shorten routes, save time and fuel, reduce traffic delays, increase capacity, and permit controllers to monitor and manage aircraft with greater safety margins because a GPS-based tracking system provides more precise data about the distance of one plane from another. Moreover, for Maritime Operations, GPS technology, coupled with geographic information system ("GIS") software, is increasing becoming the key to the efficient management and operation of automated container delivery.

Unfortunately, a problem with having a high dependence on GPS technologies is that GPS signals are not always be available (or may be interrupted) and at this time there is no backup systems to GPS other than manual navigation methods utilizing environmental sensors such as, for example, radar and celestial navigation. Examples of why GPS signals may not be available include intentional interference, unintentional interference, natural occurrences, and lack of coverage. Examples of intentional interference include jamming and spoofing where jamming includes the deliberate drowning out of legitimate GPS signals, used for positioning, navigation, and timing, and frequency alignment, using higher power signals to cause loss of GPS satellite lock and to prevent reacquisition and spoofing includes the deliberate emitting of legitimate-appearing false GPS signals to shift the computed GPS position or GPS time of a target's GPS receiver. Examples of unintentional interference and natural occurrences include out-of-band emissions from other radio sources or in-band emissions from other systems, such as, for example, other satellite navigation systems and variable conditions of the Sun and the space environment that may influence the performance and reliability of space and ground based systems such as GPS. Lack of coverage includes situations where the environment does not allow a GPS receiver to have a clear view of the necessary number of GPS satellites to calculate a position of the GPS receiver where the a two-dimensional position (lacking altitude position) of the GPS receiver requires the reception of GPS signals from at least three GPS satellites and a three-dimensional position (having altitude position) of the of the GPS receiver requires the reception of GPS signals from at least four GPS satellites. Examples of these types of environments may include mountain ranges, valleys next to mountains, forests, canyons, ravines, in-door environments, cities having tall buildings, etc.

As such, when GPS signals are not available or interrupted, there are no "fail-over" technologies that are capable of seamlessly engaging a vehicle's navigation system and providing the last known state and location of the vehicle or other individual air, land, and sea assets that were being tracked. Therefore, in the absence of this capability, navigators, air traffic controllers, and mission planners are unable to adjust and respond with confidence when there is an interruption of the GPS signals. Hence, there is a need for a system and method that is capable of solving these problems.

SUMMARY

Disclosed is an on-board backup and anti-spoofing GPS ("OBASG") system for navigating a vehicle through an environment with a GPS receiver. The GPS receiver is configured to receive GPS signals within the environment where the GPS signals may suffer a GPS outage or are unreliable within the environment. In general, the OBASG includes a GPS block-chain recorder, a block-chain storage module, an anti-spoofing module, and a backup navigation module. The GPS block-chain recorder is in signal communication with the GPS receiver and the block-chain storage module. The block-chain storage module is also in signal communication with the anti-spoofing module and the backup navigation module. The anti-spoofing module is also in signal communication with both the GPS receiver and the backup navigation module.

In an example of operation, the OBASG performs a method for navigating the vehicle through the environment with the GPS receiver, where the GPS receiver is configured to receive GPS signals within the environment but where the GPS signals may suffer a GPS outage or are unreliable within the environment. The method includes determining if the GPS receiver is receiving the GPS signals and recording the received GPS signals to the block-chain storage module if the GPS receiver is receiving the GPS signals. The method further determines if the GPS signals, received by the GPS receiver, are spoofed GPS signals and, then, retrieves position data from the block-chain storage module if the GPS receiver is not receiving the GPS signals or is receiving spoofed GPS signals.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is an on-board backup and anti-spoofing GPS ("OBASG") system for navigating a vehicle through an environment with a GPS receiver. The GPS receiver is configured to receive GPS signals within the environment where the GPS signals may suffer a GPS outage or are unreliable within the environment. In general, the OBASG includes a GPS block-chain recorder, a block-chain storage module, an anti-spoofing module, and a backup navigation module. The GPS block-chain recorder is in signal communication with the GPS receiver and the block-chain storage module. The block-chain storage module is also in signal communication with the anti-spoofing module and the backup navigation module. The anti-spoofing module is also in signal communication with both the GPS receiver and the backup navigation module.

In an example of operation, the OBASG performs a method for navigating the vehicle through the environment with the GPS receiver, where the GPS receiver is configured to receive GPS signals within the environment but where the GPS signals may suffer a GPS outage or are unreliable within the environment. The method includes determining if the GPS receiver is receiving the GPS signals and recording the received GPS signals to the block-chain storage module if the GPS receiver is receiving the GPS signals. The method further determines if the GPS signals, received by the GPS receiver, are spoofed GPS signals and, then, retrieves position data from the block-chain storage module if the GPS receiver is not receiving the GPS signals or is receiving spoofed GPS signals.

Figure 1:
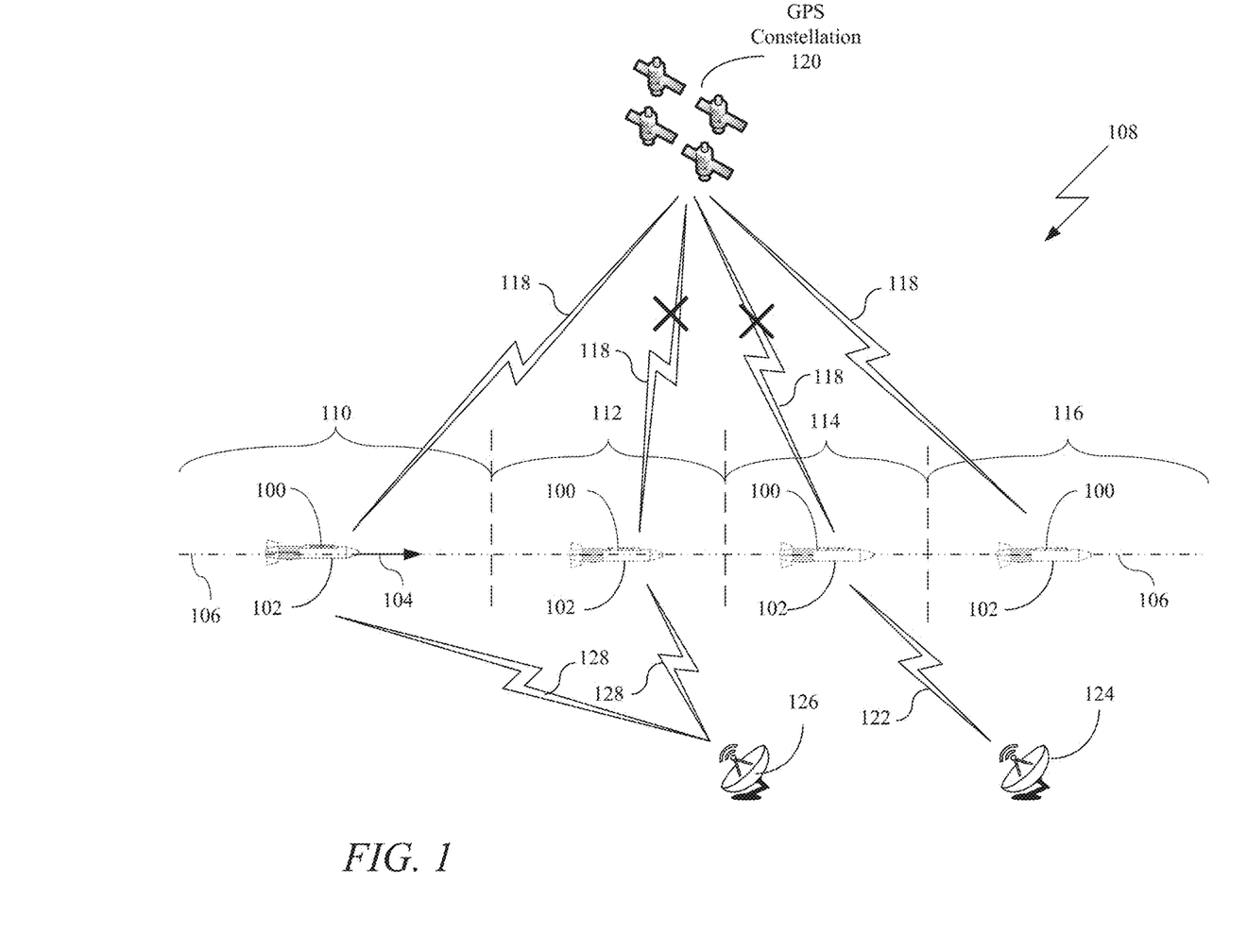
FIG. 1 is a system diagram of an example of an implementation of the on-board backup and anti-spoofing GPS ("OBASG") system on a vehicle traveling along a flight path through an environment having zones in the environment that may suffer a GPS outage or the GPS signals may be denied or are unreliable in accordance with the present disclosure.

In FIG. 1, a system diagram is shown of an example of an implementation of the OBASG system 100 on a vehicle 102 traveling in a direction 104 along a flight path 106 through an environment 108 having zones 110, 112, 114, and 116 in the environment 108 that may suffer a GPS outage of GPS signals 118 or the GPS signals 118 may be denied or are unreliable in accordance with the present disclosure. In this example, the vehicle 102 also includes a GPS receiver (not shown). The GPS receiver is in signal communication with the OBASG system 100 and is configured to receive the GPS signals 118.

In this example, the GPS signals 118 are received from the constellation of GPS satellites 120. In general, the GPS receiver needs to receive GPS signals 118 from at least four GPS satellites from the constellation of GPS satellites 120 in order to determine the position of the vehicle 102.

The vehicle 102 may be any mobile platform traveling through the environment 108. In this example, the vehicle 102 is shown to be an aerial vehicle 102; however, it is appreciated by those of ordinary skill in the art that the vehicle 102 may be any type of mobile platform that needs to know its geolocation position as it attempts to navigate through the environment 108. Examples of the vehicle 102 include, for example, an airplane, a missile, a helicopter, an unmanned vehicle ("UV"), a marine vehicle such as a ship, and terrestrial vehicles such as tanks, automobiles, buses, trains, and trucks. In this example, the vehicle 102 is an aerial platform such as an airplane, helicopter, missile, or UV. The vehicle 102 may be a private or commercial aerial platform or government (including military) aerial platform and the environment 108 may include GPS challenged zones 112 and 114 that may be the result of geological conditions along the flight path 106, environmental conditions that affect the transmission of the GPS signals 118, and hostile zones where the GPS signals 118 are being intentionally denied or spoofed.

In this example, the environment 108 shown to have four zones 110, 112, 114, and 116 where zones 110 and 116 are shown to not have an issue with receiving the GPS signals 118 from the constellation of GPS satellites 120 while zones 112 and 114 are shown to have problems in receiving the GPS signals 118. In zone 112, the GPS signal 118 is shown as not being received properly or at all by the GPS receiver in the vehicle 102 as the vehicle travels along the flight path 106. The problem with receiving the GPS signals 118 in zone 112 may be that the environmental conditions are such that the GPS signals 118 are intermittent, blocked by physical obstacles (such as for example mountains, buildings, or trees), other communication signals are interfering with the GPS receiver's ability to receive the GPS signals 118, or intentionally denied (such as, for example, jamming). Similarly, in zone 114, the GPS signals 118 is shown as either being denied or drowned out by a false GPS signals 122 produced by an external GPS source 124 to the vehicle 102. Generally, the false GPS signals 122 is intended to "spoof" (i.e., trick) the GPS receiver on the vehicle 102. Typically, zone 114 is known as having a contested degraded operation ("CDO") condition within the environment 108 where the GPS signals 118 are either denied or degraded.

Additionally, in this example, the external positional source 126 is shown in signal communication with the receiver "not shown" on the vehicle 102. The receiver may be part of a transceiver (not shown) configured to communicate with the external positional source 126 via communication link 128. The external positional source 126 is configured to provide positional data to the OBASG system 100 that assess the OBASG system 100 with navigating the vehicle 102 along the flight path 106.

Figure 2:
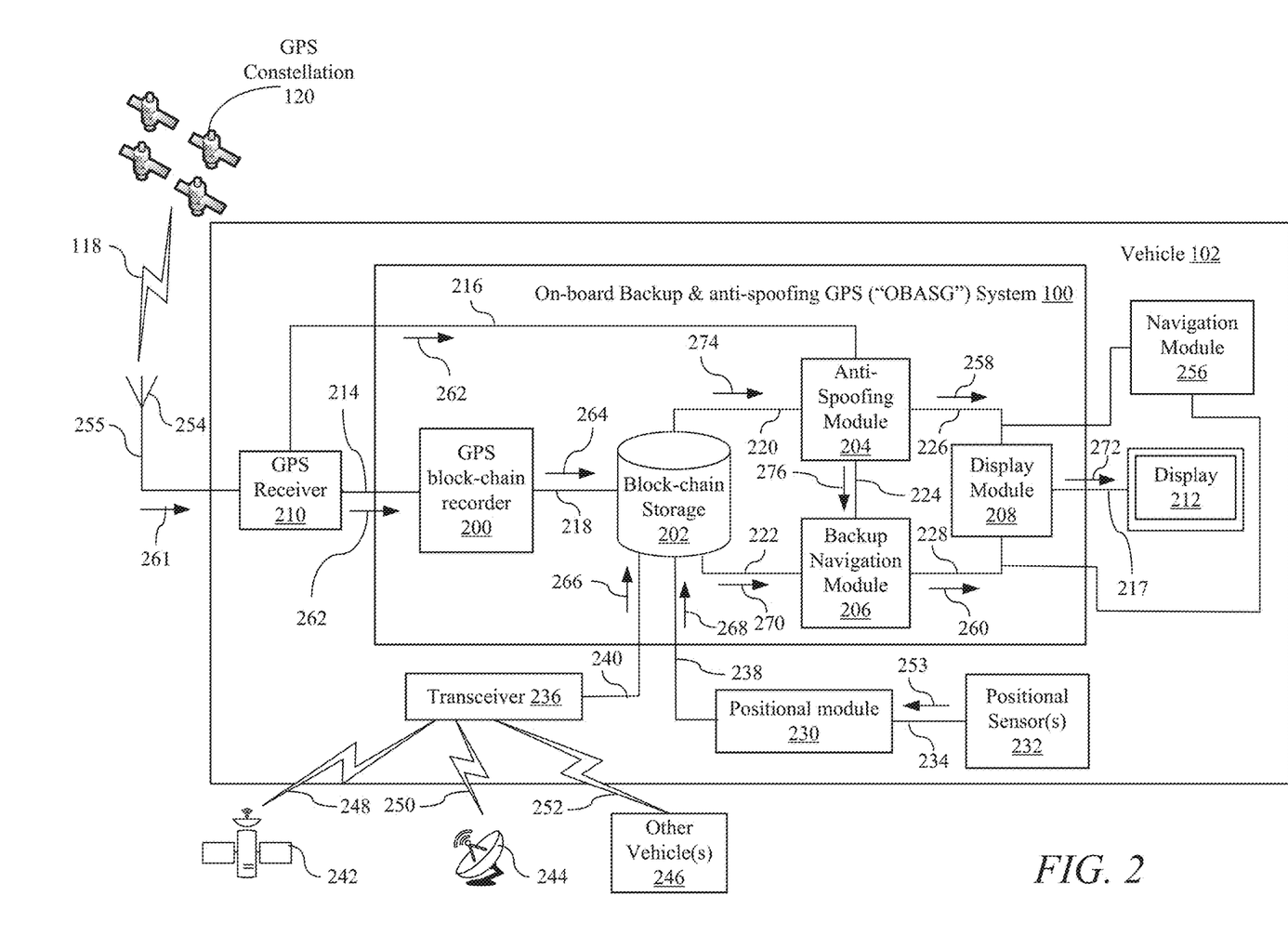
FIG. 2 is a system block diagram of an example of an implementation of an OBASG system, described in FIG. 1, in accordance with the present disclosure.

In FIG. 2, a system block diagram of an example of an implementation of the OBASG system 100 is shown in accordance with the present disclosure. As in FIG. 1, the OBASG system 100 is shown within the vehicle 102. The OBASG system 100 includes a GPS block-chain recorder 200, a block-chain storage module 202, and anti-spoofing module 204, and a backup navigation module 206. The OBASG system 100 may also include a display module 208. The OBASG system 100 is in signal communication with a GPS receiver 210 and a display 212 that are in the vehicle 102. Specifically, in this example, the GPS receiver 210 is in signal communication with both the GPS block-chain recorder 200 and anti-spoofing module 204 via signal paths 214 and 216, respectively. The block-chain storage module 202 is in signal communication with the GPS block-chain recorder 200, anti-spoofing module 204, and backup navigation module 206 via signal paths 218, 220, and 222, respectively. The anti-spoofing module 204 is in signal communication with both the backup navigation module 206 and display module 208 via signal paths 224 and 226, respectively. The display module 208 is also in signal communication with both the backup navigation module 206 and the display 212 via signal paths 228 and 217, respectively. It is appreciated by those of ordinary skill in the art that both the GPS block-chain recorder 200 and block-chain storage module 202 may be combined into a signal module.

In this example, the block-chain storage module 202 may be any type of known data storage device that can be on-board the vehicle 102 such as, for example, a solid-state memory, read-access memory ("RAM"), read-only memory ("ROM"), electro-mechanical storage device such as, for example, a hard-drive, or other equivalent devices or components. In general, the block-chain storage module 202 includes a database (not shown) and the database may be any type of known organized collection of meta-data of location related information that may include, for example, records valid GPS signals, two and three-dimensional maps of the environment 108 that the vehicle 102 is going to travel through, GPS ephemeris data for calculating the position of each GPS satellite in orbit, GPS almanac data that includes information about the time and status of the entire GPS constellation, time-stamps, last known velocities and heading, etc. The database may be a distributed database that is linked to a network (not shown) where the database includes a cryptographic hash of preceding records in the database and is accessible to all users of the distributed database. As such, the block-chain storage module 202 may include a first meta-data of the location information about the asset (i.e., the vehicle 102), targeting location information (e.g., the ending second location such as an airport, base, port, target, etc.), and a second meta-data of the environmental information that includes spatial information about the geography of the environment 108, maps (both two-and-three-dimensional), and positional information of objects within the environment 108. These objects may be external platforms, such as other aircraft, satellites, ships, trucks, automobiles, tanks, etc., where the positional information may include positional data related to the location, velocity, and trajectory of the platforms external to and geographically near the vehicle 102. The block-chain storage module 202 may also include third meta-data having positional data related to the location, velocity, and trajectory of tactical and strategic objectives near the vehicle 102 and fourth meta-having geolocation data pertaining to landmarks and other points of interest.

In this disclosure, the term "block-chain" is utilized in relation to the GPS block-chain recorder 200, block-chain storage module 202, and backup navigation module 206, where a block-chain is, in general, a distributed database that maintains a continuously-growing list of data records hardened against tampering and revision and includes data structure blocks and optionally programs or executables. Each block contains a timestamp and information linking the block to a previous block where a "block-chain" consists of blocks that hold timestamped batches of valid data. Each block includes the hash of the prior block that links the blocks together, where a "hash" is a hash function that is utilized to map data of arbitrary size to data of a fixed size. In order to add more security a cryptographic hash function may be utilized that assists in verify the authenticity of the entry in the block.

The linked blocks form a "chain," with each additional block reinforcing those before it, thus this database type is known as a "block-chain" database because the blocks are recorded as a series of dependent hashes (i.e., entry N is recorded as a hash of itself as well as entry N−1). As a result, the block-chain makes it difficult for third-parties (or even the operators) to manipulate the data within the block-chain database. Generally, the block-chain database is protected by cryptography and the block-chain database does not reside in a single database on a single server but across a distributed network of servers or non-server computers. Accordingly, whenever new entry is entered (e.g., uploaded to the block-chain storage module 202), the block-chain database is authenticated across this distributed network, then the entry is included as a new block on the chain. This distributed network may be spread across a plurality of block-chain databases located at the external sources that include the communication satellite 242, ground-station 244, or one of more other vehicles 246. In this example, every block-chain database located at the external sources 242, 244, and 246 would be nodes in a decentralized network that have a copy of the block-chain database which avoids the need for a centralized database management by a trusted third party. As such, these nodes can each validate entries, add them to their copy and then broadcast the additions of the entries to other nodes. The nodes may then use various known time-stamping techniques to time-stamp the entries.

The vehicle 102 may also include a position module 230 in signal communication with one or more positional sensors 232 via signal path 234 and a transceiver 236. In this example, the block-chain storage module 202 is in signal communication with both the positional module 230 and transceiver 236 via signal paths 238 and 240, respectively. Moreover, the transceiver 236 may be in signal communication with a communication satellite 242, ground-station 244, or one of more other vehicles 246 via signal paths 248, 250, and 252, respectively. As such, the transceiver 236 may include the receiver described in FIG. 1 that is in signal communication with the external positional source 126 where the external positional source 126 may include the communication satellite 242, ground-station 244, or one of more other vehicles 246 via signal paths 248, 250, and 252, respectively. Moreover, the communication link 128 may include signal paths 248, 250, and 252, respectively. The positional module 230 is configured to receive positional data 253 from the one or more positional sensors 232 that may include, for example, inertial measurement units ("IMUs" such as, for example, gyroscopes, altimeters, accelerometers), radar, laser, infrared homing optics, terrain matching, or star-tracking technologies. These positional sensors 232 are on-board positional sensors.

In this example, an IMU is generally an electronic device, component, module, or circuit that is configured to measure and report the velocity and orientation of the vehicle 102 plus the gravitational forces experienced by the vehicle 102. The IMU may include a combination of accelerometers, gyroscopes, and magnetometers and may be part of an inertial navigation system (not shown) within the vehicle 102.

The GPS receiver 210 is a device, component, module, or circuit capable of receiving the GPS signals 118 from the constellation of GPS satellites 120. The GPS receiver 210 may be a GPS tracker or a GPS receiver. A GPS receiver is a device capable of receiving the GPS signals and, in response, producing GPS-related data that is utilized to determine both the pseudo-range values for the received GPS signals and a resulting location of the GPS receiver based on the received pseudo-range values. A GPS tracker is a device capable of only receiving the GPS signals and determining the corresponding pseudo-range values without determining a resulting location of the GPS tracker based on the pseudo-range values.

In this example, the GPS receiver 210 is configured to receive a plurality of GPS signals 118 from the constellation of GPS satellites 120 via an antenna 254 in signal communication with the GPS receiver 210 via signal path 255. In order to determine its position, the GPS receiver 210 needs to receive at least four individual GPS signals from the plurality of GPS signals 118 that correspond to four separate GPS satellites from the constellation of GPS satellites 120. Specifically, each GPS satellite of the constellation of GPS satellites 120 continually broadcasts a GPS signal (that is a carrier wave with modulation) of the plurality of GPS signals 118 that includes a pseudorandom code (i.e., sequence of ones and zeros known as a "PRN code") and a message. The PRN code is known by the GPS receiver 210 and by time-aligning a GPS receiver-generated version and a GPS receiver-measured version of the PRN code, the time of arrival ("TOA") of a defined point in the PRN code sequence (known as an "epoch") can be found in the GPS receiver clock time scale. The message also includes the time of transmission ("TOT") of the code epoch (again in GPS system time scale) and the GPS satellite position at the TOT. In general, the PRN code includes two ranging codes that include a coarse/acquisition ("C/A") code, which is freely available to the public, and a restricted precision ("P") code, usually reserved for military or government applications. The C/A PRN codes have a period of 1,023 chips transmitted at 1.023 Mbit/s with a 1 millisecond period and are combined with the message (also known as a "navigation message") to create a bit stream that is utilized to modulate the GPS signals 118. In the GPS, these C/A PRN codes only match up, or strongly auto-correlate, when they are almost exactly aligned. Additionally, each GPS satellite has a unique C/A PRN code and the C/A PRN codes are highly orthogonal to each other such that a given C/A PRN code from one GPS satellite does not correlate well with another GPS satellite C/A PRN code. As a result, the GPS receiver 210 is capable of determining which GPS satellite of the constellation of GPS satellites it has received.

The display module 208 is device, component, circuit, or module that is configured to produce the navigation information that is displayed on the display 212. This navigation information may include the prioritized position, velocity, and time snapshots of the vehicle 102 and other objects, landmarks, assets, or target within the environment 108 that the vehicle is traveling through. The navigation information may also include programmable confidence threshold rules that display objects on the display 212 in a way that shows the confidence level of the navigation information to the operator of the vehicle 102. As an example, display colors may be utilized to show the confidence of the position of the vehicle 102 and other objects on a geographical map such that the color "green" of an object (including the vehicle 102) may designate high confidence because the GPS receiver 210 is receiving real-time GPS signals 118. The color "yellow" may designate a medium confidence level because the GPS signals 118 are intermittent or degraded. Moreover, the color "red" may designate lower confidence level because there is a GPS outage, the GPS signals 118 are being denied (e.g. jammed), or the GPS signals 118 are being spoofed. In this example, the display module 208 may include a display module processor (not shown) for processing the received positional data from either the anti-spoofing module 204 or backup navigation module 206 in order to produce the navigation information that is transmitted to the display 212. This display module processor may be, for example, a general purpose processor having a central processing unit ("CPU"), a microprocessor, an application specific integrated circuit ("ASIC"), digital signal processor ("DSP"), field programmable gate array ("FPGA"), etc. The display module 208 may also include a display module storage module (not shown) that includes a memory for storing the received positional data and/or navigation information. Utilizing the display module storage module, the display module 208 is configured to graphically replay the history of asset movement in a three-dimensional map utilizing the high confidence data (where real-time GPS signals 118 were received), lower confidence data (where GPS is either intermittent or denied) with prediction, or both. In general, the display module 208 is configured to process, predict, and visualize the real-time movements of the vehicle 102, landmarks, and other assets (including friend or foe targets).

Similarly, the navigation module 256 may also include a navigation module processor (not shown) and a navigation module storage module (not shown). This navigation module processor may be, for example, a general purpose processor having a CPU, a microprocessor, an ASIC, DSP, FPGA, etc. In general, the navigation module 256 is configured to perform many of the same functions as the display module 208 without having to perform the visual display functionality of the display module 208 and optionally including control functionality for automatically navigating the vehicle 102 through the environment 108. In one example of an implementation, the navigation module 256 may be utilized by an autopilot function on an aircraft or maritime vessel or as an autonomous navigation unit on an unmanned vehicle. Alternatively, in a manned vehicle 102 the display module 208 and navigation module 256 may be combined into a signal module configured to perform the functionality of both. As an example, a combined module would provide confidence level information on a display that an operator may use while also providing auto-pilot functionality to the vehicle 102 if the operator decides to operate under auto-pilot.

In operation, the GPS receiver measures the TOAs (according to its own clock) of the four GPS satellite signals. From the TOAs and the TOTs, the GPS receiver forms four time of flight ("TOF") values, which are (given the speed of light) approximately equivalent to GPS receiver-GPS satellite range differences. The GPS receiver then computes its three-dimensional position and clock deviation from the four TOFs. In general, the GPS receiver position (in three dimensional Cartesian coordinates with origin at the Earth's center) and the offset of the GPS receiver clock relative to the GPS time are computed simultaneously, utilizing navigation equations to process the TOFs. The receiver's Earth-centered solution location is usually converted to latitude, longitude and height relative to an ellipsoidal Earth model. The height may then be further converted to height relative the geoid (i.e., the global mean sea level used to measure precise surface elevations on Earth). These coordinates may then be displayed on the display 212 (e.g. on a moving map display) and/or recorded by the GPS block-chain recorder 200.

In this example, it is appreciated by those skilled in the art that the OBASG system 100 may also be in signal communication with a navigation module 256 via signal paths 226 and 228. The navigation module 256 may be system, device, component, circuit, or module that is capable of navigating the vehicle 102 along the flight path 106 based on the received positional data 258 and 260 from the OBASG system 100. The navigation module 256 may include a navigation processor (not shown), a mapping module (not shown), and control module (not shown) to control the movement and direction of the vehicle 102 and may receive additional navigation data from the positional module 230 and at least one positional sensor 232. In general, the navigation module 256 may provide navigation correction information to directional controls (not shown) of the vehicle 102. The directional controls may include control surfaces on the housing, wings, other aerodynamic components, and propulsion systems of the vehicle 102 that are utilized to direct the movement of the vehicle 102 as it flies a trajectory path along the flight path 106.

In this disclosure, the circuits, components, modules, and/or devices of, or associated with, the improved OBASG system 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the vehicle 102 may be initiated to perform a mission such as, for example, traveling from a starting first location (e.g., at a base, airport, parking lot, dock, station, facility, etc.) to an ending second location (e.g., another base, airport, parking lot, dock, station, facility, etc. far from the first starting position) along a flight, terrain, or maritime path (such as, for example, flight path 106). Before leaving the first location, the OBASG system 100 may receive initial block-chain data from an external source (not shown) at the first location (such as, for example, a USB device, CD, DVD, wireless connection, a local server, the Internet, etc. The initial block-chain data may be uploaded and stored in the block-chain storage module 202. The initial block-chain data may include position, velocity, and time data for the vehicle 102.

Once uploaded, the vehicle 102 begins the mission and attempts to receive GPS signals 118 from the GPS constellation of GPS satellites 120 with the GPS receiver 210. If the GPS receiver 210 receives the GPS signal 118, the received GPS signals 261 are processed by the GPS receiver 210 to produce real-time GPS location data 262 that includes real-time position, velocity, and time information about the GPS receiver 210 and, therefore, about the vehicle 102. The real-time GPS location data 264 is then passed to the GPS block-chain recorder 200 and anti-spoofing module 204 via signal paths 214 and 216, respectively. The GPS block-chain recorder 200 receives the real-time GPS location data 264 and either passes or converts (via signal path 218) it to a recorded snapshot of data 264 (which is the GPS-related data produced by the GPS receiver 210) that is input into and stored by the block-chain storage module 202. The recorded snapshot of GPS location data 264 includes position, velocity, and time information about the vehicle 102. Additionally, the transceiver 236 may be in signal communication with one or more of the external sources that include the communication satellite 242, ground-station 244, or one of more other vehicles 246 via signal paths 248, 250, and 252, respectively. While in communication with these external sources 242, 244, and 246, the transceiver 236 may receive updated external block-chain positional data 266 that may be passed, along signal path 240, and stored in the block-chain storage module 202. The updated external positional data 266 may include position, velocity, and time information about the vehicle 102 or other assets, obstacles, landmarks, points-of-interest, etc. on the path through the environment 108. Similarly, the block-chain storage module 202 may also receive sensor positional data 268 from the positional module 230 along signal path 238 that includes position, velocity, inertial state, and time information about the vehicle 102.

If the OBASG system 100 determines that no GPS signals 118 are present, the backup navigation module 206 retrieves the block-chain data 270, via signal path 222, related to the navigation of the vehicle 102. The resulting navigation information 272 is displayed on the display 212 by the display module 208 receiving the positional data 260 via signal path 228 from the backup navigation module 206. Since the block-chain data 270 is valid geolocation data, the block-chain data 270 may be utilized by the display module 208 or navigation module 256 to determine the location, via triangulation, of other landmarks, assets, targets, etc.

If, instead, the OBASG system 100 determines that GPS signals 118 are present, the anti-spoofing module 204 receives the received GPS signals 262, via signal path 216, and compares them against retrieved block-chain data 274 from the block-chain storage module 202 via signal path 220. If the result of the comparison is that the received GPS signals 262 are valid, the anti-spoofing module 204 passes, via signal path 226, to the display module 208 which produces the navigation information 272 that is displayed on the display 212 via signal path 217. If, instead, the result of the comparison is that the received GPS signals 262 are invalid (i.e., spoofed), the anti-spoofing module 204 passes, via signal path 224, a notification signal 276 to the backup navigation module 206 that retrieves the block-chain data 270, via signal path 222, related to the navigation of the vehicle 102 and passes it as positional data 260, via signal path 228, to the display module 208. The display module 208 then produces the navigation information 272 that is displayed on the display 212 via signal path 217. In this example, the block-chain data 270 is data that includes prioritized position, velocity, and time snapshots (i.e., a block of data out of the plurality of blocks) of the vehicle 102. In this example, the display module 208 may include a confidence threshold module (not shown) configured to produce confidence threshold information that is related to a predestined confidence level that is assigned to the difference scenarios for displaying the navigation information on the display 212.

In summary, the OBASG system 100 is configured to utilize distributed security, block-chain technology, anti-tampering and anti-spoofing techniques, geological mapping, and prediction analysis; and to operate under two general situations where the first is normal GPS operation and the second is operation during GPS interruptions. In the case of normal GPS operations, the OBASG system 100 provides redundancy and provides the ability (through comparative analysis) to confirm the authenticity of the GPS signals 118 and thwart GPS spoofing. Alternatively, in the case of operation during GPS interruptions that may be caused by unintentional interference, GPS system problems, or the environment and intentional GPS CDO conditions within the environment 108 where the GPS signals 118 are either denied or degraded, the operator of the vehicle 102 will continue to have the ability to have awareness of their location within the environment 108 with a reasonable confidence threshold and the location of friendly and unfriendly assets within a theatre of operation within the environment 108. In general, the OBASG system 100 is configured to capture the last known attributes of all assets (both friend and foe) and capture critical attributes that include position, directional heading, and velocity of all the assets and remaining fuel of the vehicle 102. The OBASG system 100 is configured to continue functioning until the GPS signals 118 are restored.

It is appreciated by those skilled in the art, that the OBASG system 100 may include a processor (not shown) acting as a controller that is in signal communication with and controls the operation and communication of data between the GPS receiver 210, GPS block-chain recorder 200, block-chain storage module 202, anti-spoofing module 204, backup navigation module 206, display module 208, transceiver 236, and positional module 230. Moreover, the OBASG system 100 may also include a navigation filter (not shown) that may be a fusion filter in signal communication with the GPS block-chain recorder 200, transceiver 236, position module 230, and block-chain storage module 202. The fusion filter may be a device, component, of module, circuit, or other type of device that is configured to receive multiple inputs 264, 266, and 268 from the different types of data provided by the GPS block-chain recorder 200, transceiver 236, position module 230 and, in response, produce GPS-related meta-data that may be stored in the block-chain database of the block-chain storage module 202 as valid blocks of the block-chain data.

As an example, the fusion filter may be Kalman filter (or an extended Kalman filter) that utilizes the statistical characteristics of a measurement model to recursively estimate the fused data of the different sources—GPS block-chain recorder 200, transceiver 236, position module 230. In general, Kalman filter is capable of fusing the position, velocity, and time measurements from the GPS block-chain recorder 200, transceiver 236, position module 230 and provide both an estimate of the current state of the navigation data and also a prediction of the future state of the navigation data. In this example, every output from the Kalman filter would be a GPS-related meta-data update that is input into the block-chain database.

Figure 3:
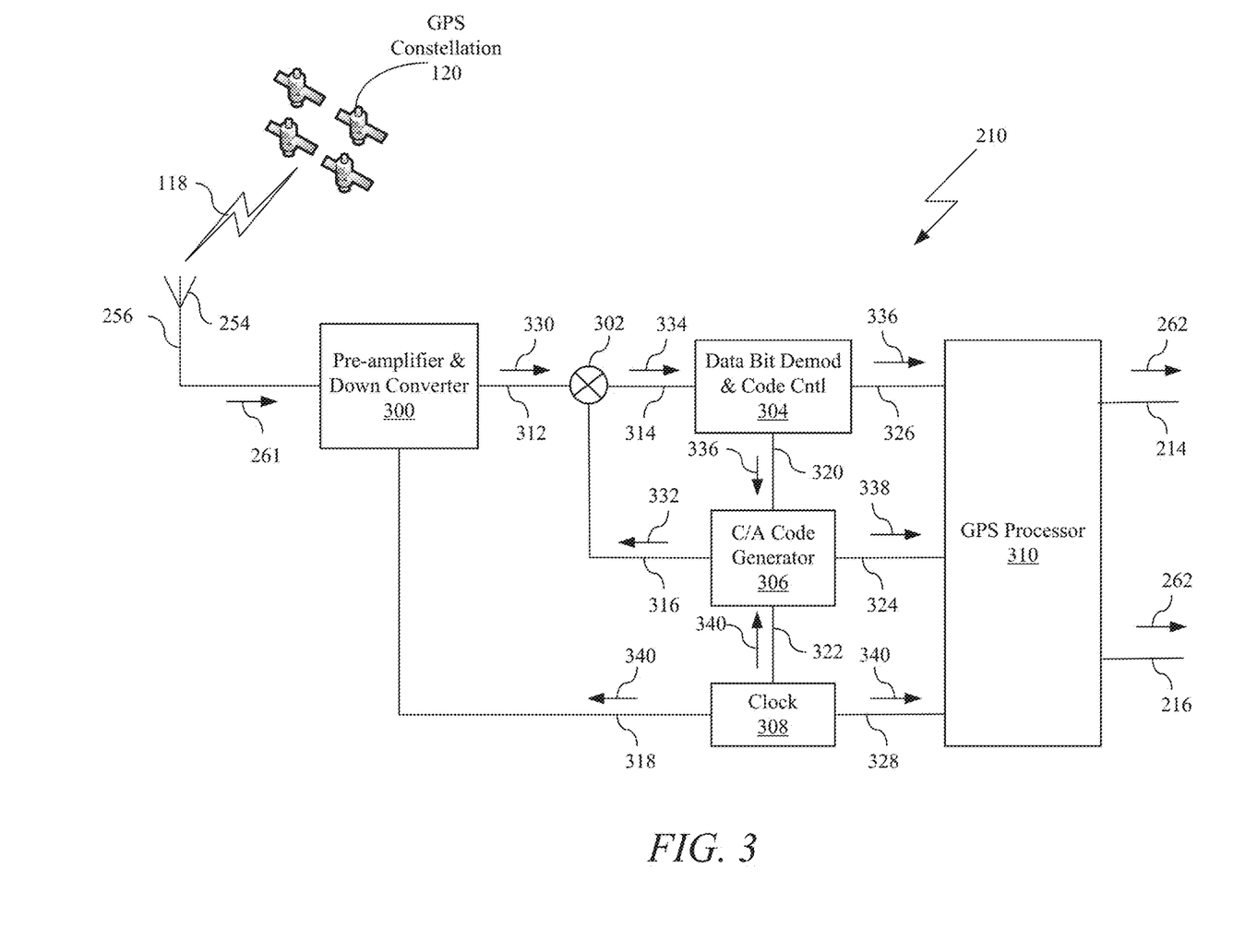
FIG. 3 is a system block diagram of an example of an implementation of a GPS receiver as shown in FIG. 2, in accordance with the present disclosure.

Turning to FIG. 3, a system block diagram is shown of an example of an implementation of the GPS receiver 210, shown in FIG. 2, in accordance with the present disclosure. In this example, the GPS receiver 210 includes a pre-amplifier and down-converter module 300, a mixer 302, a data bit demodulator and code control module 304, C/A code generator 306, a clock module 308, and a GPS processor 310. In this example, the antenna 254 receives the GPS signals 118 and passes then to the pre-amplifier and down-converter module 300 which is the generally known as the front-end of the GPS receiver 210. In this example, the mixer 302 is in signal communication with the pre-amplifier and down-converter module 300, data bit demodulation and code control module 304, C/A code generator 306, and a clock module 308 via signal paths 312, 314, 316, and 318, respectively. The C/A code generator 306 is also in signal communication with the data bit demodulation and code control module 304, clock module 308, and GPS processor 310 via signal paths 320, 322, and 324. The GPS processor 310 is also in signal communication with demodulation and code control module 304, clock module 308, GPS block-chain recorder and anti-spoofing module 204 via signal paths 326, 328, 214, and 216, respectively. The GPS processor 310 produces the real-time received GPS signals 262 (i.e., GPS-related data) that is passed to the GPS recorder 200.

In general, the GPS signals 261 are CDMA spread spectrum signals and the pre-amplifier and down-converter module 300 removes the carrier signal (i.e., down-converts) the received GPS signals 261 into a plurality of intermediate-frequency ("IF") signals that are converted into an in-phase ("I") and quadrature-phase ("Q") signals 330 which correspond to the real and imaginary parts of the received GPS signals 118. The I/Q signals 330 are mixed, at mixer 302, with C/A codes 332 generated by the C/A code generator 306 and the resulting signal 334 is passed to the data bit demodulation and code control module 304. The data bit demodulation and code control module 304 then produces a navigation message signal 336 that is passed to the GPS processor 310 and C/A code generator 306 via signal paths 326 and 320, respectively. The C/A code generator 306 then produces a C/A code measurement signal 338 that is also passed to the GPS processor via signal path 324. The clock 308 also provides a clock signal 340 to the pre-amplifier and down-converter module 300, C/A code generator 306, and GPS processor 310 via signal paths 318, 322, and 328, respectively.

Figure 4:
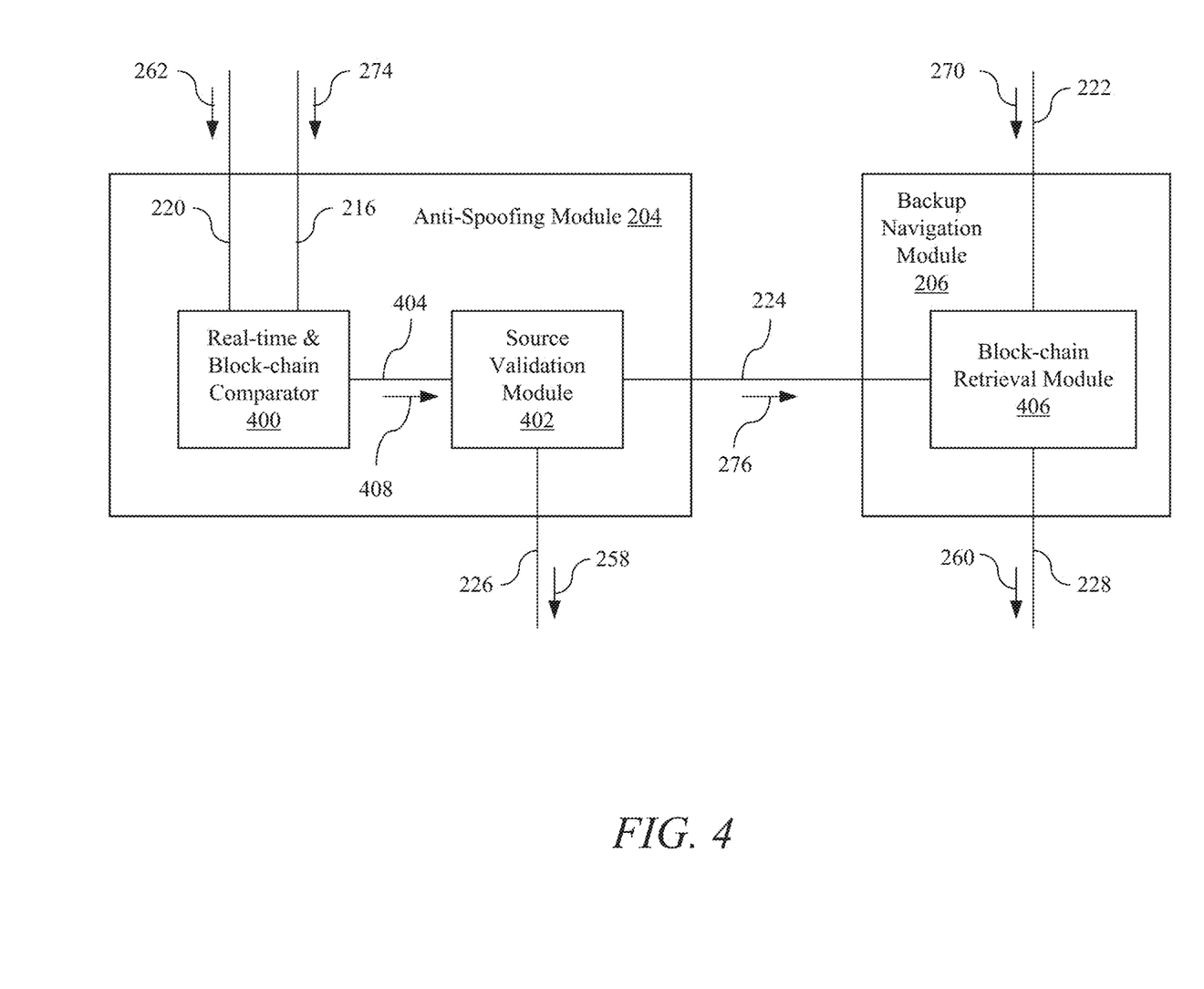
FIG. 4 is a system block diagram of an example of an implementation of the anti-spoofing module and backup navigation module shown in FIG. 2, in accordance with the present disclosure.

In FIG. 4, a system block diagram is shown of an example of an implementation of both the anti-spoofing module 204 and the backup navigation module 206, shown in FIG. 2, in accordance with the present disclosure. In this example, the anti-spoofing module 204 includes a real-time and block-chain comparator 400 and source validation module 402, where the real-time and block-chain comparator 400 and source validation module 402 are in signal communication via signal path 404. Moreover, the backup navigation module 206 includes a block-chain retrieval module 406 that is in signal communication with the source validation module 402 via signal path 404. In this example, the real-time and block-chain comparator 400 is in signal communication with the GPS receiver 210 and block-chain storage module 202 via signal paths 216 and 220, respectively; and the block-chain retrieval module 406 is in signal communication with the anti-spoofing module 204 and display module 208 via signal paths 224 and 228, respectively.

The real-time and block-chain comparator 400 may be any device, component, circuit, or module, either hardware, software, or both, that is configured to compare the real-time received GPS signals 262 and retrieved block-chain data 274, and, in response, produce a comparison signal 408 that is utilized by the source validation module 402 to determine if the real-time received GPS signals 262 are valid or spoofed. The block-chain retrieval module 406 may include a storage buffer (not shown) for storing the retrieved block-chain data 270 from the block-chain storage module 202. Example devices for the real-time and block-chain comparator 400 include a correlator, matched filter, DSP, and a processor.

In an example of operation, the real-time and block-chain comparator 400 receives the real-time received GPS signals 262, from the GPS receiver 210 via signal path 216, and compares them against retrieved block-chain data 274 from the block-chain storage module 202 via signal path 220. The resulting comparison signal 408 is passed (via signal path 404) to the source validation module 402 that validates that the whether the received GPS signals 262 are valid and not spoofed. The source validation module 402 may utilize time-series analysis to monitor patterns of movement of the vehicle 102 relative to other asset locations as described in the block-chain database in the block-chain storage module 202. Moreover, the real-time and block-chain comparator 400 may utilize a threshold detector (not shown) to determine the "likeness" that the received GPS signals 262 are not valid (i.e., spoofed) based on programmable threshold levels that are set by the source validation module 402, where the source validation module 402 may include a processor (not shown) to program the threshold levels and analyze the resulting comparison signals 408 provided by the real-time and block-chain comparator 400. This processor may be, for example, a general purpose processor having a CPU, a microprocessor, an ASIC, DSP, FPGA, etc.

If the resulting comparison is that the received GPS signals 262 are valid, the anti-spoofing module 204 transmits to the display module 208, via signal path 226, the received positional data 258 which produces the navigation information 272 that is displayed on the display 212 via signal path 217. If, instead, the resulting comparison is that the received GPS signals 262 are invalid, the source validation module 402 sends the notification signal 276 to the block-chain retrieval module 406 within the backup navigation module 206 via signal path 224. Once received, the backup navigation module 206 then retrieves the block-chain data 270, via signal path 222, related to the navigation of the vehicle 102 and passes it as retrieved positional data 260, via signal path 228, to the display module 208.

Figure 5:
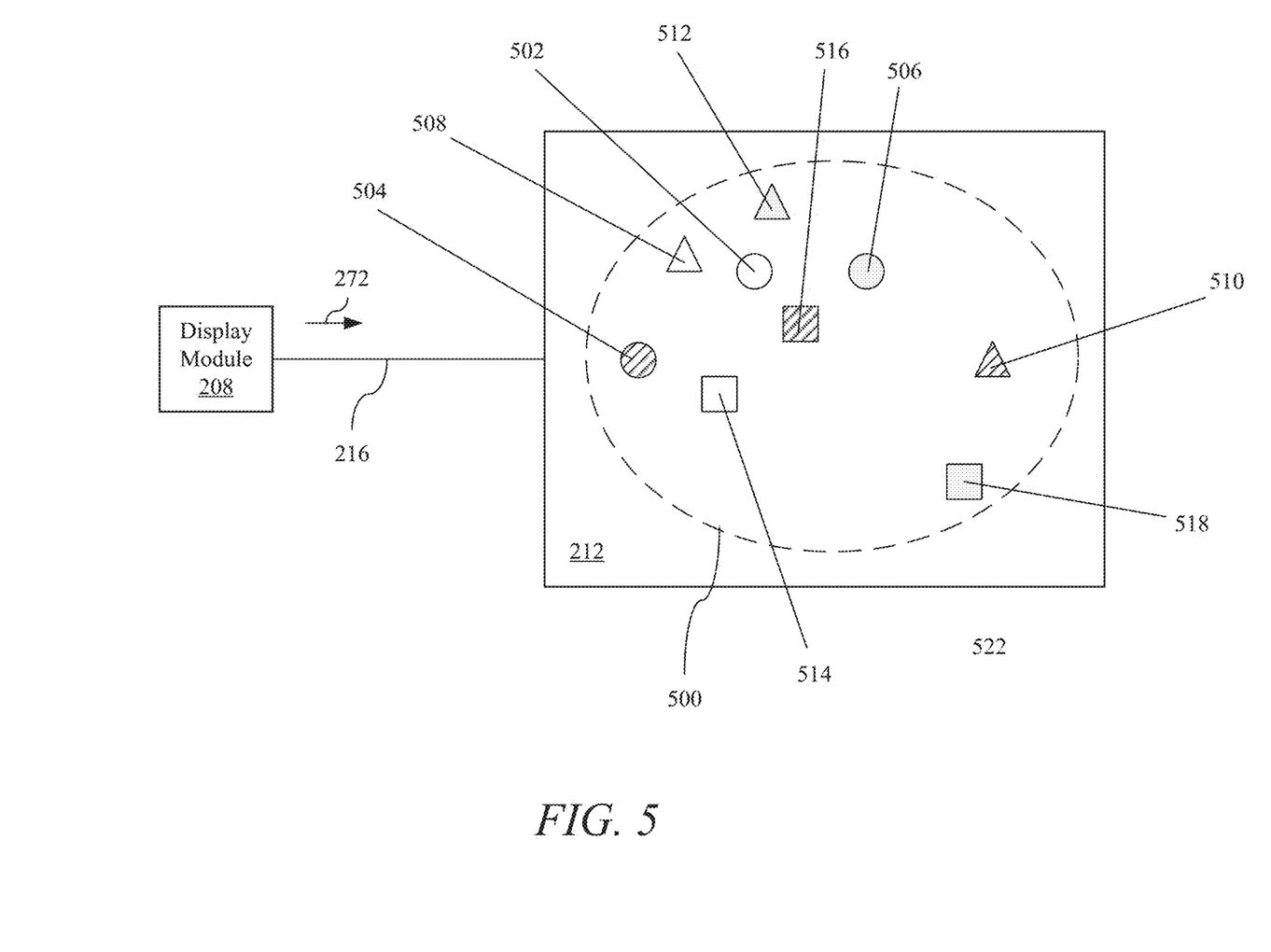
FIG. 5 is a system block diagram of an example of an implementation of the display module and display shown in FIG. 2, in accordance with the present disclosure.

In FIG. 5, a system block diagram of an example of an implementation of the display module 208 and a display 212, shown in FIG. 2, in accordance with the present disclosure. In this example, a plurality of objects 500 are shown as being displayed on the display 212 per the earlier discussion and the display module 208 is configured to display positional-related data on the display 212 of a plurality of objects 500. The displayed navigation information of the display 212 is related to the GPS signals 118 or the retrieved positional 260. The plurality of objects 500 are shown with varying degrees of confidence shown by the different shading of the objects 500. For example, as discussed earlier, the unshaded objects 502, 508, and 514 that are unshaded may be considered of high confidence (i.e., the "green" assets). The lightly shaded objects 506, 512, and 518 may be considered of intermediate confidence (i.e., the "yellow" assets). The darker shaded objects 504, 510, and 516 may be considered of low confidence (i.e., the "red" assets). As discussed earlier, in this example, the display module 208 may include a confidence threshold module (not shown) configured to produce confidence threshold information that is related to one or more predestined confidence levels that are assigned to the difference scenarios for displaying the navigation information on the display 212 as the high, intermediate, and low confidence levels shown.

Figure 6:
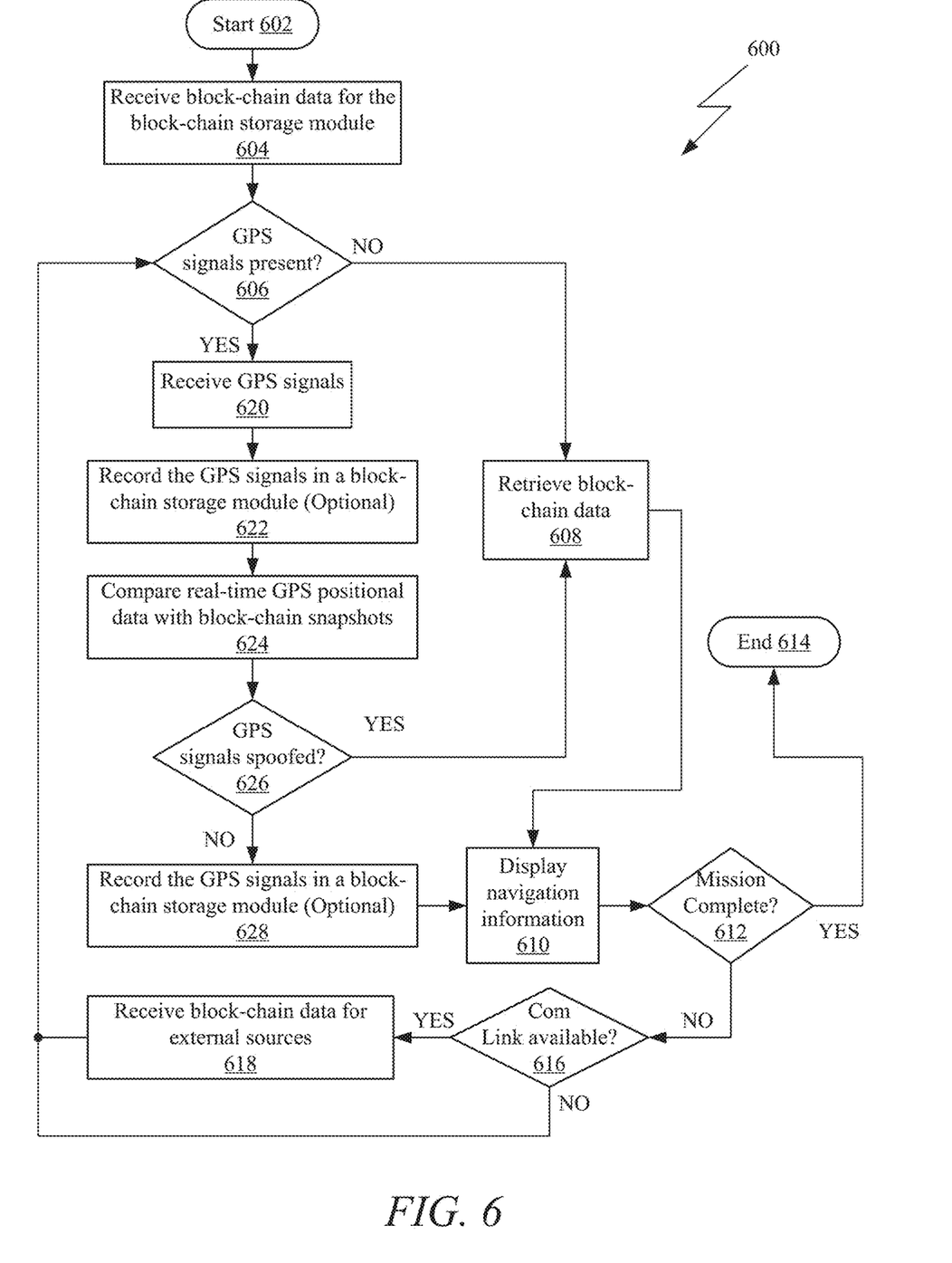
FIG. 6 is a flowchart of an example of an implementation of a method performed by the OBASG shown in FIG. 1, in accordance with the present disclosure.

Turning to FIG. 6, a flowchart is shown of an example of an implementation of a method 600 performed by the OBASG system 100, shown in FIG. 1, in accordance with the present disclosure. In this example, it is assumed that the vehicle 102 being tasked to perform a mission and is located at a starting position before beginning the mission. The mission may be, for example, a flight itinerary for a private or commercial aircraft along a flight path 106 or government or military mission flight profile if the vehicle 102 is an aircraft, a maritime navigation path is the vehicle 102 is a maritime vessel, or terrain navigation path for a land-based vehicle 102 such as, for example, a tank, bus, truck, train, automobile, or motorcycle.

In this example, the method 600 starts 602 by receiving initial block-chain data from an external source and storing the initial block-chain data into the block-chain storage module 202 in step 604 prior to starting the mission for the vehicle 102. Step 604 may be performed by the user in a commercial or private scenario such as, for example, uploading navigation data to the block-chain storage module 202 from a USB device, CD, DVD, wireless connection, local server, the Internet, etc. In the government or military scenario, the vehicle 102 may be located at a government facility or base where the navigation data is uploaded into the block-chain storage module 202. Once uploaded, the vehicle 102 begins the mission and attempts to receive GPS signals 118 from the GPS constellation of GPS satellites 120. If the OBASG system 100 determines, in decision step 606, that no GPS signals 118 are present, the block-chain retrieval module 306, in step 608, retrieves the block-chain data related to the navigation of the vehicle 102. The resulting navigation information 272 is displayed on the display 212 by the display module 208 in step 610. The OBASG system 100 then determines, in decision step 612, if the mission is complete. If the mission is complete, the method 600 ends 614. If instead, the mission is not complete, the method 600 continues to decision step 616. In decision step 616, the OBASG system 100 determines if a communication signal path (i.e., a communication link) 248, 250, or 252 exists between the OBASG system 100 and either the communication satellite 242, ground-station 244, or other vehicles 246. If no communication signal path exits the method 600 returns to decision step 606 where the OBASG system 100 determines if there are any GPS signals 118 present and the method repeats. If, instead, a communication signal path 248, 250, or 252 does exist between the OBASG system 100 and either the communication satellite 242, ground-station 244, or other vehicles 246, the OBASG system 100 receives and uploads block-chain data from one or more of these external sources in step 618 and the method 600 again returns to decision step 606 where the OBASG system 100 determines if there are any GPS signals 118 present and the method repeats. In these examples, as discussed earlier, the communication signal paths 248, 250, and 252 are assumed to be secure.

If, instead, the OBASG system 100 determines, in decision step 606, that GPS signals 118 are present, the method 600 continues instead to optional step 620 where the GPS receiver 210 receives the GPS signals 118 and passes the GPS signals 118 to the OBASG system 100. At this point in the method 600, the GPS block-chain recorder 200 may optionally record the GPS signals 118 in the block-chain storage module 202. The reason that step 620 is optional is that the OBASG system 100 may need to optionally check the integrity of the received GPS signals to make sure that they are not false GPS signals 122 (i.e., spoofed GPS signals). The method 600 then compares the real-time GPS positional data determined from the received GPS signals 118 against block-chain snapshots from the block-chain storage module 202. The reason that optional step 622 is optional is that the OBASG system 100 may need to optionally check the integrity of the received GPS signals to make sure that they are not false GPS signals 122 (i.e., spoofed GPS signals). The method 600 then, in decision step 626, compares the real-time GPS positional data determined from the received GPS signals 118 against block-chain snapshots from the block-chain storage module 202. If the anti-spoofing module 204 determines, in decision step 626, that the received GPS signals 118 are false GPS signals 122, the block-chain retrieval module 306, in step 608, again retrieves the block-chain data related to the navigation of the vehicle 102. The resulting navigation information 272 is displayed on the display 212 by the display module 208 in step 610. The OBASG system 100 then determines, in decision step 612, if the mission is complete. If the mission is complete, the method 600 ends 614. If instead, the mission is not complete, the method 600 continues to decision step 616. In decision step 616, the OBASG system 100 determines if the communication signal path 248, 250, or 252 exists between the OBASG system 100 and either the communication satellite 242, ground-station 244, or other vehicles 246. If no communication signal path exits, the method 600 returns to decision step 606 where the OBASG system 100 determines if there are any GPS signals 118 present and the method repeats. If, instead, a communication signal path 248, 250, or 252 does exist between the OBASG system 100 and either the communication satellite 242, ground-station 244, or other vehicles 246, the OBASG system 100 receives and uploads block-chain data from one or more of these external sources in step 618 and the method 600 again returns to decision step 606 where the OBASG system 100 determines if there are any GPS signals 118 present and the method repeats.

If instead, the anti-spoofing module 204 determines, in decision step 626, that the received GPS signals 118 are not spoofed, the method 600 continues to optional step 628 where the GPS block-chain recorder 200 may optionally record the GPS signals 118 in the block-chain storage module 202. The reason that optional step 628 is optional is that the GPS signals 118 may have already been recorded by the GPS block-chain recorder 200 in optional step 622. If the GPS signals 118 have not be recorded prior to comparing the real-time GPS positional data with the block-chain snapshots, in step 624, they are recorded in optional step 628. The resulting navigation information 272 from is displayed on the display 212 by the display module 208 in step 610. The OBASG system 100 then determines, in decision step 612, if the mission is complete. If the mission is complete, the method 600 ends 614. If instead, the mission is not complete, the method 600 continues to decision step 616. In decision step 616, the OBASG system 100 determines if the communication signal path 248, 250, or 252 exists between the OBASG system 100 and either the communication satellite 242, ground-station 244, or other vehicles 246. If no communication signal path exits, the method 600 returns to decision step 606 where the OBASG system 100 determines if there are any GPS signals 118 present and the method repeats. If, instead, a communication signal path 248, 250, or 252 does exist between the OBASG system 100 and either the communication satellite 242, ground-station 244, or other vehicles 246, the OBASG system 100 receives and uploads block-chain data from one or more of these external sources in step 618 and the method 600 again returns to decision step 606 where the OBASG system 100 determines if there are any GPS signals 118 present and the method repeats.

It will be understood that various aspects or details of the implementations may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. An on-board backup and anti-spoofing global positioning system ("GPS") system for navigating a vehicle through an environment, the on-board backup and anti-spoofing GPS system comprising:

a memory storing validated position data in one or more blocks of a block-chain, the validated position data including at least a first block indicating a starting position of the vehicle at a starting point of a mission;

a first receiver configured to receive GPS signals during the mission;

a second receiver configured to receive positional data distinct from the GPS signals during the mission, wherein the positional data includes geolocation data identifying an observed location of the vehicle as observed by an observer distinct from the vehicle and velocity data identifying an observed velocity of the vehicle as observed by the observer;

a processor configured to perform operations comprising:

using a Kalman filter to generate an estimated current position of the vehicle based on a plurality of previously validated location retrieved from the block-chain and the positional data;

generating navigation data, wherein the navigation data comprises the estimated current position of the vehicle;

performing a comparison of a particular location identified by the GPS signals and a previously validated location retrieved from the block-chain;

responsive to the comparison indicating that the particular location is consistent with the previously validated location, store the particular location in a block of the block-chain as validated position data;

storing the navigation data in a block of the block-chain; and retrieving current positional data from the block-chain, wherein the current positional data corresponds to the navigation data responsive to the comparison indicating that the particular location is not consistent with the previously validated location, and wherein the current positional data corresponds to the validated position data responsive to the comparison indicating that the particular location is consistent with the previously validated location.

2. The on-board backup and anti-spoofing GPS system of claim 1, wherein the validated position data is stored in the one or more blocks of the block-chain before the vehicle departs on the mission.

3. The on-board backup and anti-spoofing GPS system of claim 1, wherein the observer corresponds to a communication satellite, a second vehicle, a stationary ground-station, or a combination thereof.

4. The on-board backup and anti-spoofing GPS system of claim 1, wherein the positional data further includes a position of a point of interest, a velocity of the point of interest, or a combination thereof.

5. The on-board backup and anti-spoofing GPS system of claim 4, wherein the point of interest corresponds to a landmark.

6. The on-board backup and anti-spoofing GPS system of claim 1, wherein generating the navigation data comprises generating navigation correction information.

7. The on-board backup and anti-spoofing GPS system of claim 1, further comprising an inertial measurement unit configured to generate sensor data indicating movement of the vehicle, and wherein the sensor data is distinct from the positional data.

8. The on-board backup and anti-spoofing GPS system of claim 7, wherein the inertial measurement unit comprises a gyroscope, an altimeter, an accelerometer, a magnetometer, or a combination thereof.

9. The on-board backup and anti-spoofing GPS system of claim 7, wherein the operations further comprise storing the sensor data in a second block of the block-chain.

10. The on-board backup and anti-spoofing GPS system of claim 7, wherein the validated position data includes a prior GPS location and the sensor data.

11. A method for navigating a vehicle through an environment, the method comprising:
storing validated position data in one or more blocks of a block-chain, the validated position data including at least a first block indicating a starting position of the vehicle at a starting point of a mission
receiving, at a processor of an anti-spoofing GPS system of the vehicle, GPS signals during the mission;
receiving, at the processor, positional data distinct from the GPS signals during the mission, wherein the positional data includes geolocation data identifying an observed location of the vehicle as observed by an observer distinct from the vehicle and velocity data identifying an observed velocity of the vehicle as observed by the observer;
using a Kalman filter to generate an estimated current position of the vehicle based on a plurality of previously validated location retrieved from the block-chain and the positional data;
generating, at the processor, navigation data, wherein the navigation data comprises the estimated current position of the vehicle;
performing, at the processor, a comparison of a particular location identified by the GPS signals and a previously validated location retrieved from the block-chain;
responsive to the comparison indicating that the particular location is consistent with the previously validated location, storing the particular location in a block of the block-chain as validated position data;
storing the navigation data in a block of the block-chain; and
retrieving current positional data from the block-chain, wherein the current positional data corresponds to the navigation data responsive to the comparison indicating that the particular location is not consistent with the previously validated location, and wherein the current positional data corresponds to the validated position data responsive to the comparison indicating that the particular location is consistent with the previously validated location.

12. The method of claim 11, further comprising, after storing the particular location in the block of the block-chain as validated position data, transmitting the block to one or more devices of a distributed network.

13. The method of claim 11, further comprising:
determining a confidence level corresponding to the navigation data; and
displaying the navigation data and the confidence level.

14. The method of claim 13, wherein displaying the navigation data and the confidence level includes displaying a plurality of display objects associated with an environment around the vehicle, wherein a particular display object is represented using a color corresponding to the confidence level.

15. The method of claim 11, wherein performing the comparison comprises determining a difference between the particular location and the previously validated location, and wherein the comparison indicates that the particular location is not consistent with the previously validated location responsive to the difference satisfying a threshold.

16. The method of claim 15, further comprising generating an estimated future position of the vehicle based on a plurality of blocks of the block-chain.

17. The method of claim 16, further comprising storing the estimated future position in the block-chain.

18. The method of claim 11, wherein starting position of the vehicle is stored in the one or more blocks of a block-chain before the vehicle departs on the mission.

19. The method of claim 11, further comprising storing a targeting location associated with the mission and spatial information descriptive of an environment associated with the mission in the block-chain.

20. The method of claim 11, wherein a second block of the block-chain includes target information indicating a location of a target of the vehicle.

* * * * *

UNITED STATES PATENT AND TRADEMARK OFFICE
CERTIFICATE OF CORRECTION

| | |
|---|---|
| PATENT NO. | : 10,705,221 B2 |
| APPLICATION NO. | : 15/177134 |
| DATED | : July 7, 2020 |
| INVENTOR(S) | : Christopher W. Raab, John W. Glatfelter and Kelly C. Hill |

It is certified that error appears in the above-identified patent and that said Letters Patent is hereby corrected as shown below:

In the Claims

Claim 18, Column 18, Line 47, change:
"18. The method of claim 11, wherein starting position of"

To read:
--18. The method of claim 11, wherein a starting position of--

Signed and Sealed this
Eighteenth Day of August, 2020

Andrei Iancu
*Director of the United States Patent and Trademark Office*